United States Patent [19]
Lamparter

[11] Patent Number: 6,099,933
[45] Date of Patent: Aug. 8, 2000

[54] ILLUMINATED SIGN ASSEMBLY

[75] Inventor: Ronald C. Lamparter, Grosse Pointe Shores, Mich.

[73] Assignee: Transpec Inc., Troy, Mich.

[21] Appl. No.: 09/016,845

[22] Filed: Jan. 30, 1998

Related U.S. Application Data

[63] Continuation-in-part of application No. 08/525,119, Sep. 8, 1995, Pat. No. 5,634,287, application No. 08/525,115, Sep. 8, 1995, Pat. No. 5,796,331, and application No. 08/525,120, Sep. 8, 1995, Pat. No. 5,687,500.

[51] Int. Cl.$^7$ ....................................................... B32B 3/02
[52] U.S. Cl. .......................... 428/99; 428/119; 428/122; 40/572

[58] Field of Search ..................................... 428/119, 122, 428/83, 120, 81, 99; 40/572

Primary Examiner—Alexander Thomas
Attorney, Agent, or Firm—Reising, Ethington, Barnes, Kisselle, Learman & McCulloch P.C.

[57] ABSTRACT

A school bus is equipped with a stop sign mechanism that includes a sealed electrical actuator assembly and bezel that are mounted on the street side of the school bus and an illuminated sign assembly having integral arms that are hinged on the actuator assembly for pivotal movement. Illuminated sign assemblies of two general types are disclosed. In one, light emitting diodes (LEDs) are disposed in hollow letter shaped embossments of a translucent lens to illuminate the word stop. In the other lamp assemblies are disposed above and below the word stop.

6 Claims, 5 Drawing Sheets

ILLUMINATED SIGN ASSEMBLY

This is a continuation-in-part of U.S. patent application Ser. No. 08/525,119 filed Sep. 8, 1995, U.S. Pat. No. 5,634,287 for an Illuminated Sign Housing Assembly; U.S. patent application Ser. No. 08/525,115 filed Sep. 8, 1995, U.S. Pat. No. 5,796,331 for an Illuminated Pivotal Sign Assembly; and U.S. patent application Ser. No. 08/525,120 filed Sep. 8, 1995, U.S. Pat. No. 5,687,500 for a Stop Sign Housing with Flashing Lights.

BACKGROUND OF THE INVENTION

This invention relates generally illuminated sign assemblies and more particularly to illuminated sign assemblies such as illuminated stop sign assemblies that are pivotally mounted on school busses.

School busses commonly include an illuminated stop sign assembly that is pivotally mounted on the street side of the bus. This stop sign assembly is pivoted outwardly and illuminated, usually with flashing red lights, when the bus stops to control traffic so that school children can cross the road safely as they walk toward or away from the school bus.

My prior U.S. Pat. No. 5,357,239 issued Oct. 18, 1994 discloses an actuating device for pivoting an illuminated stop sign assembly that is pivotally attached to the street side of the school bus. Known stop sign assemblies generally comprise a metal octagonal sign carrying the word stop on the front and back of the sign (similar to the familiar traffic stop sign) and a pair of vertically spaced red lights that flash on command of the bus driver as shown in my patent more or less schematically.

In my three pending patent applications identified above, I have disclosed improvements for illuminated sign assemblies such as the stop sign assemblies that are pivotally mounted on school busses to control traffic and safeguard children on their way to and from the school bus.

SUMMARY OF THE INVENTION

The object of this invention is to provide further developments, improvements and/or refinements for illuminated sign assemblies in general and for illuminated sign assemblies such as disclosed in my aforesaid pending patent applications in particular.

The illuminated signs of my pending patent applications generally fall into two general types. In one, light emitting diodes (LEDs) are disposed in hollow letter shaped embossments of a lens to illuminate the word stop. In the other lamp assemblies are disposed above and below the word stop.

A feature of this invention is that the illuminated sign assembly comprises two sign housing shells that have deep internal walls that fully overlap and bottom out when the housing shells are secured to each other to provide a very strong and stable region for displaying the sign indicia. This feature is advantageous in both types and even more advantageous in the LED type sign assembly where the deep walls provide a seal for an internal lens cavity.

Another feature of the invention is that the illuminated sign assembly has a unique fastening arrangement for two sign housing shells that provides a good peripheral seal at the abutting edges of the two sign housing shells that extends around the entire periphery of the fastened housing shells.

Still another feature of the invention is that the illuminated sign assembly has a network of internal wiring channels that provide confronting outlets at the respective ends of spaced hinge arms to provide optional paths for passing internal wiring into an actuator assembly and/or school bus.

Yet another feature of the invention is that the illuminated sign assembly may be provided with a trim bezel that improves appearance and safeguards the illuminated sign assembly in the stored position.

A feature of the invention with respect to the LED type of illuminated sign assembly is the shaping of hollow letter embossments of a lens and letter cut-outs of a sign housing and the attachment of the lens to the sign housing to enhance protrusion of the hollow letter embossments and the resulting improved visibility that the protruding hollow letter embossments provide. This is generally accomplished by letter straps and/or internal heat staked studs of the sign housing and cooperating portions of the hollow letter embossments and the lens.

A feature of the invention with respect to the lamp type of illuminated sign assembly is inclusion of a molded cradle as an integral part of a molded sign housing shell to facilitate mounting of the lamp socket and assembly of the sign housing.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
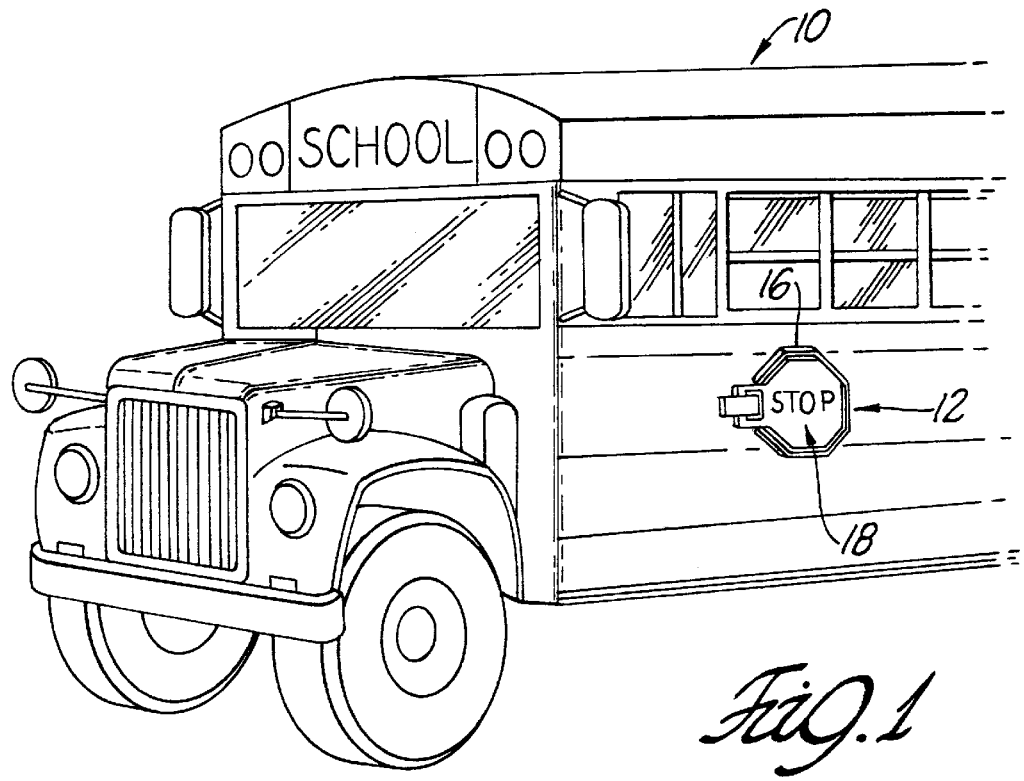
FIG. 1 is a perspective view of a school bus equipped with an illuminated sign assembly in accordance with the invention.

Referring now to the drawing, FIG. 1 shows a school bus 10 equipped with a stop sign mechanism indicated generally at 12. The stop sign mechanism 12 comprises a sealed electrical actuator assembly 14 and bezel 16 that are mounted on the street side of the school bus 10 and an illuminated sign assembly 18 having integral hinge arms that are attached to the actuator assembly 14 for pivotal movement. The actuator assembly 14 pivots the illuminated sign assembly 18 between a retracted (stored) position where it is nested in bezel 16 adjacent the street side of the school bus 10 and an extended (operative) position where the illuminated sign assembly 18 extends outwardly of the bus side 16 in a perpendicular fashion.

The actuator assembly 14 provides a tamper proof and weather proof environment for several electrical and mechanical components including an electric motor and a motor control circuit for pivoting the illuminated sign 18 assembly back and forth between the stored position and the operative position.

The internal details of the actuator assembly 14 which are not necessary for an understanding of this invention, are described in my pending U.S. patent application Ser. No. 08/654,680, filed May 29, 1996, U.S. Pat. No. 5,719,553 and entitled SEALED ELECTRICAL ACTUATOR ASSEMBLY FOR HINGED VEHICLE SAFETY DEVICES.

The illuminated sign assembly 18 comprises a molded plastic, preferably opaque housing 20 having a front shell 22 and a rear shell 24 that are attached together to provide a hollow octagonal sign 26 having two horizontal, vertically spaced hollow hinge arms 28 and 30 for pivotally attaching the sign assembly 18 to the actuator assembly 14.

The front and rear shells 22 and 24 are basically mirror images of each other with some modifications that will become clear from the following description.

Figure 3:
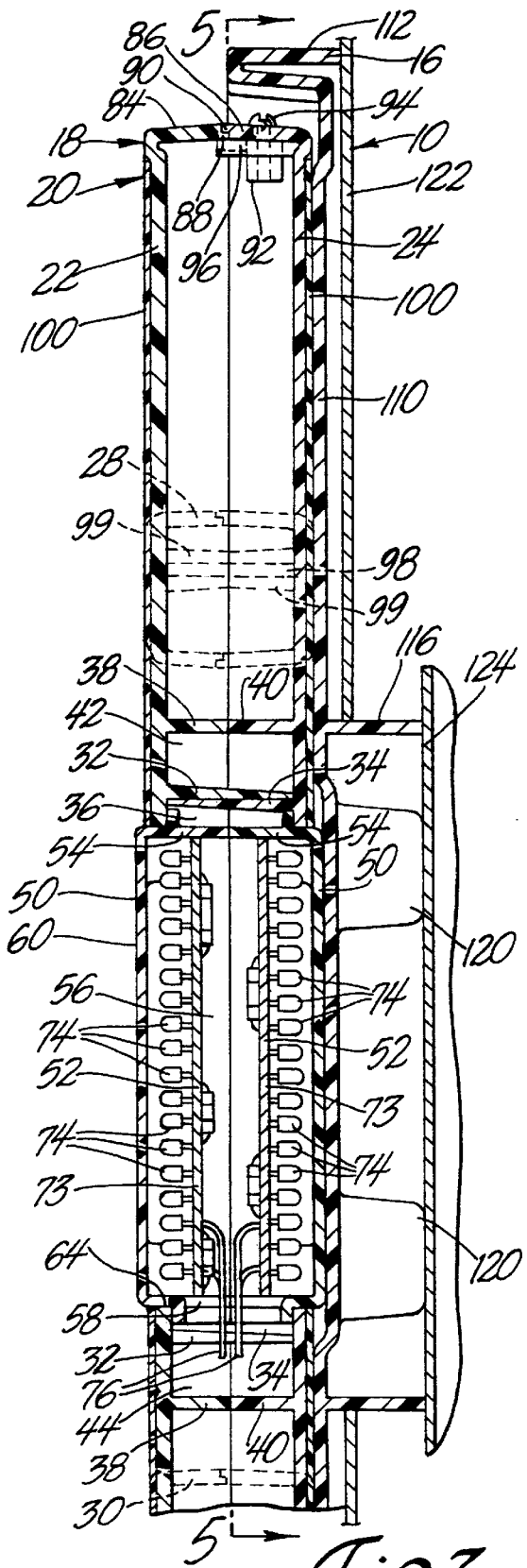
FIG. 3 is a section taken substantially along the line 3—3 of FIG. 2 looking in the direction of the arrows.
Figure 4:
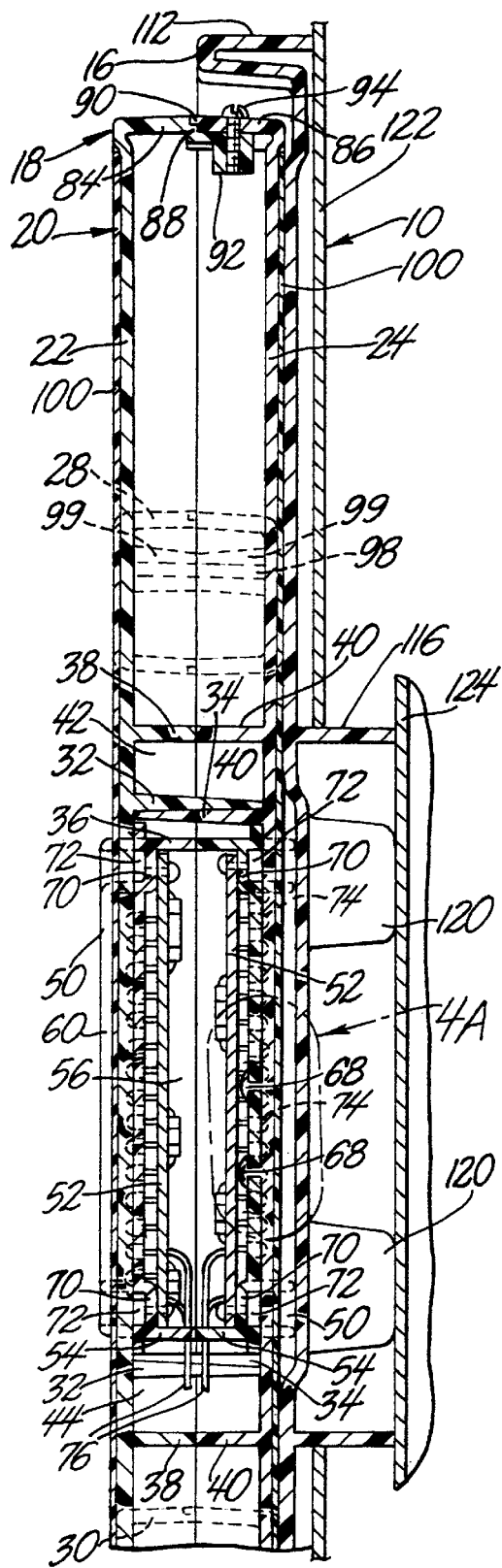
FIG. 4 is a section taken substantially along the line 4—4 of FIG. 2 looking in the direction of the arrows.
Figure 5:
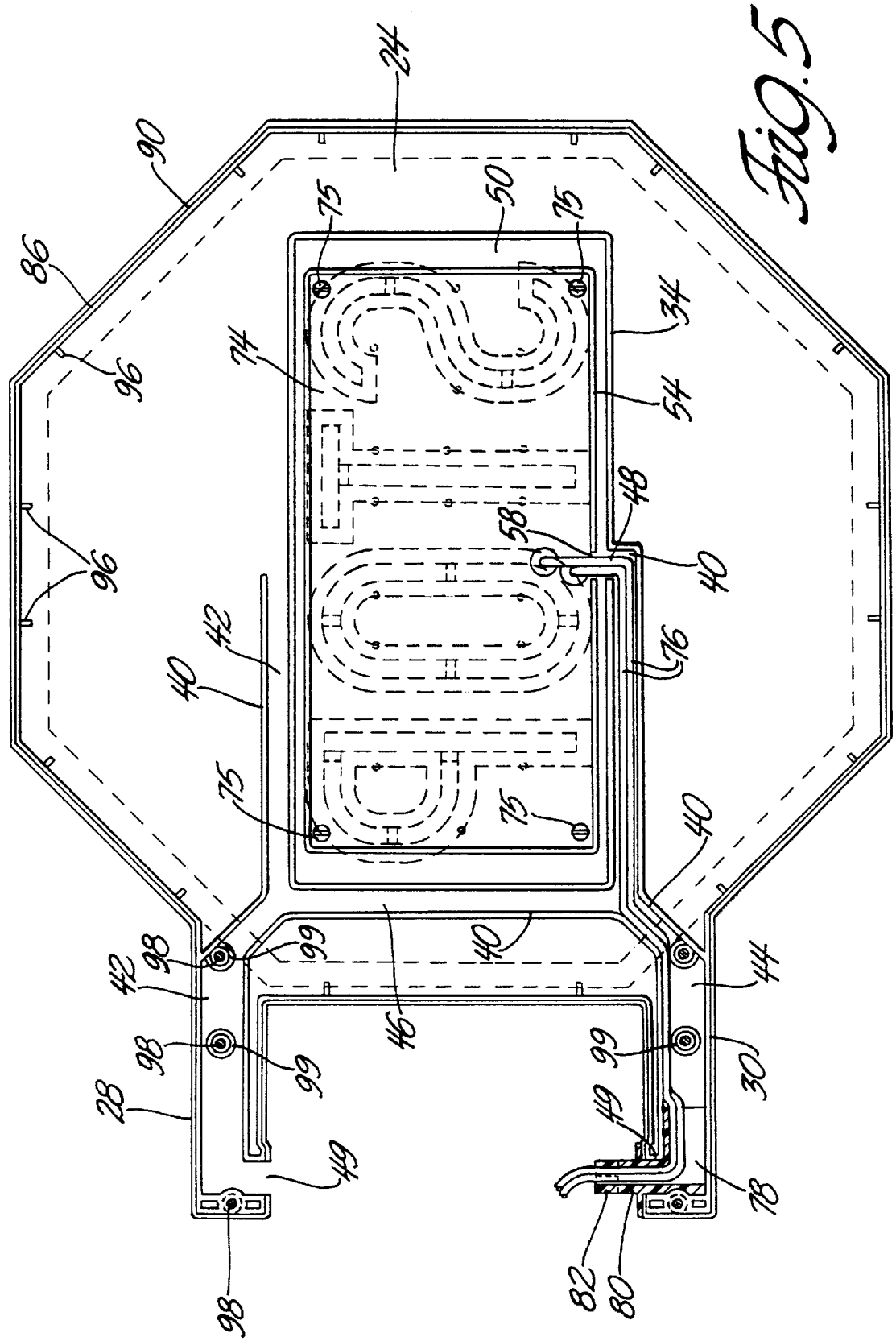
FIG. 5 is a section taken substantially along the line 5—5 of FIG. 3 looking in the direction of the arrows and shows a front view of a rear subassembly for the illuminated sign assembly of FIGS. 1–5.

The front shell 22 has a deep internal rectangular wall 32 and the rear shell 24 has a corresponding deep internal rectangular wall 34. The walls 32 and 34 are sized so that one slides and fits within the other when the housing shells 22 and 24 are fastened to each other. In this particular instance the rear wall 34 fits within the front wall 32 however, the reverse arrangement can be used. In any event, the walls 32 and 34 are preferably deep enough so that each wall fully overlaps the other and bottoms out on an interior face of the opposite shell as best shown in FIGS. 4 and 5. This provides a very strong and stable central section of the hollow sign 26 for carrying indicia such as the word stop shown in FIGS. 1–5.

Moreover in the case of the LED type illuminated sign assembly the deep rectangular walls 32 and 34 help form an environmentally sealed internal lens cavity 36.

The front and rear shells 22 and 24 each have a number of shallow walls 38 and 40 respectively that cooperate with the deep rectangular walls 32 and 34 and exterior walls of the hinge arms 28 and 30 to form a network of open wire channels in each shell. These shallow internal walls 38 and 40 abut each other to close the open wire channels when the shells 22 and 24 are secured together as best shown in FIGS. 3 and 4.

The network of channels formed by the walls 32, 34, 38 and 40 comprises two horizontal wire channels 42 and 44 that extend from the middle of the elongated sides of the internal lens cavity 36 to the respective exterior corners of lens cavity 36 adjacent the hinge arms 28 and 30 where the channels 42 and 44 communicate with each other by means of a vertical channel 46. The horizontal channels 42 and 44 then continue on through the respective hollow hinge arms 28 and 30 to confronting outlets 49 in the respective ends of the two associated hinge arms 28 and 30.

This network of channels provides several continuous paths for electrical wiring from the internal lens cavity 36 to pass through the interior of the sign housing 20 to an outlet 49 at the end of either hinge arm 28 or 30. The network of wiring channels also permits the placement of an outlet for the internal lens cavity 36 anywhere along the portions of the overlapping cavity walls 32 and 34 that are part of the wiring channels and thus the network of wiring channels provides many options for leading electrical wires out of lens cavity 36 and into the actuator assembly 14 through the interior of the molded plastic housing 20.

In the case of the LED type illuminated sign assembly, the internal lens cavity 36 preferably has a single lower outlet 48 and the electrical wiring from the lens cavity 36 is preferably led directly out of the hollow sign housing 20 through the lower horizontal wiring channel 44 and the lower hinge arm 30. This arrangement minimizes the potential for water damage to the electrical wiring and the electrical components within the internal lens cavity 36 that form part of the illuminated sign assembly 18.

There are two identical translucent lenses 50 and two identical electrical subassemblies 52 inside the internal lens cavity 36 that are associated with the respective front and rear shells 22 and 24 in a substantially identical manner.

Each lens 50 is attached to one of the shells and each lens 50 has a rectangular shaped peripheral wall 54 that abuts the peripheral wall of the other lens when the shells 22 and 24 are secured together so as to form a sealed compartment 56 for the two electrical subassemblies 52. The compartment 56 has an outlet 58 in the abutting peripheral walls 54 that aligns with the outlet 48 in the deep overlapping walls 32, 34 of the housing shells 22 and 24 that form the internal lens cavity 36.

Figure 2:
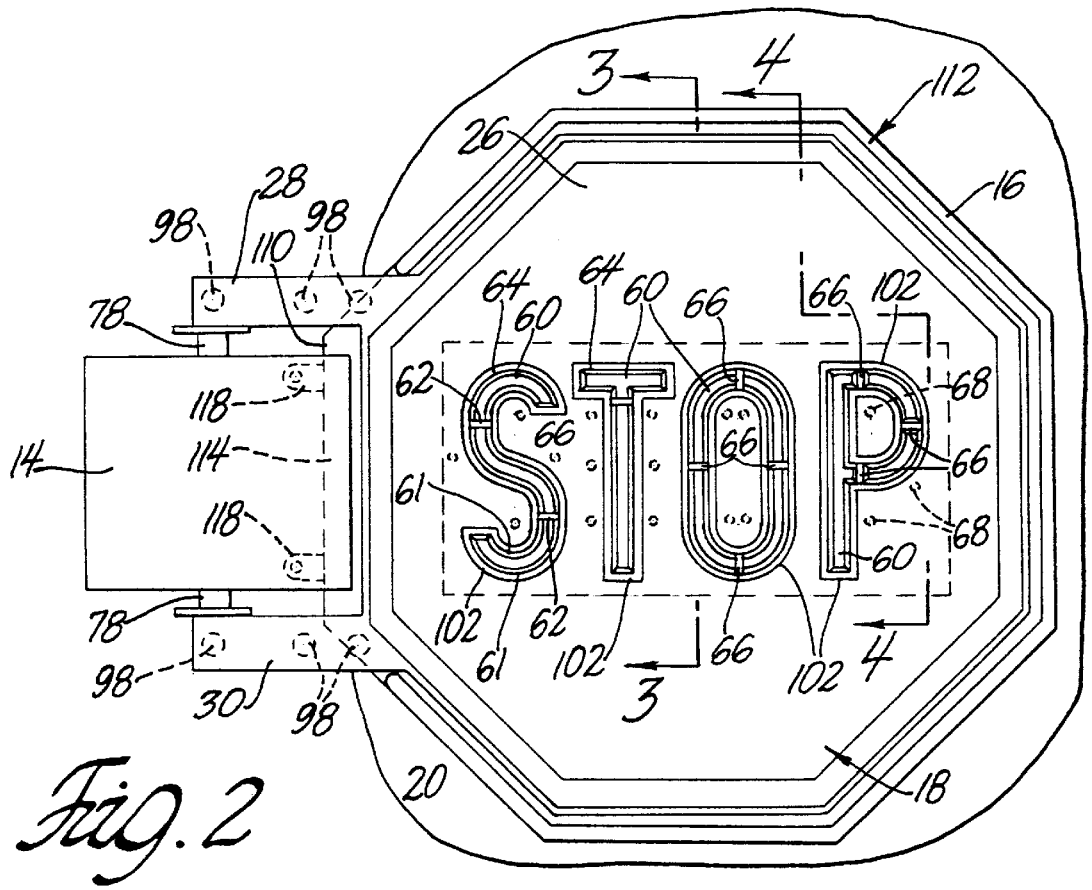
FIG. 2 is an enlarged front view of the illuminated sign assembly shown in FIG. 1.

The face of each lens 50 has hollow embossments 60 that in this particular instance essentially form the letters S, T, O and P so as to spell out the word stop as best shown in FIG. 2. The letter shaped embossments 60 have beveled edges 61 to facilitate assembly of the lenses 50 to the respective housing shells 22 and 24 and interruptions 62 for enhancing the projection of the hollow letter shaped embossments 60 as explained below. The face of each housing shell 22 and 24 has a matching array of slots 64 that spell out the word stop. Slots 64 extend through the portion of the face that is within the boundary of and thus supported by the deep overlapping rectangular walls 32 and 34 that form part of the internal lens cavity 36. The plurality of shell slots 64 essentially form the letters S, T, O and P, but the letters are interrupted by straps 66 that fit into corresponding interruptions 62 of the hollow embossments 60 of the lens 50.

The face of each lens 50 also has a plurality of small apertures that are close to the hollow letter embossments 60 and the slotted face of each housing shell 22 and 24 has integral internal plastic studs 68 in a matching pattern as best shown in FIGS. 2 and 4. These plastic studs 68 are inserted into the small apertures and heat staked so that the slotted face of the shells 22 and 24 are clamped against the respective faces of the lenses 50 around the hollow embossments 60 when the lenses are attached. This clamping enhances the protrusion of the hollow embossments 60 outwardly of the slotted faces of the housing shells 22 and 24. The protrusion is further enhanced by the shell straps 66 that fit in the embossment interruptions 62. These shell straps 66 strength the slotted portions of the shell faces and inhibit the shell faces from pulling away from the faces of the lenses 50 at the slot edges.

This protrusion enhancement is advantageous because the protrusion of the hollow embossments 60 enhances visibility of the hollow embossments 60 that are lit by LEDs within the compartment 56 formed by the two abutting lenses 50 as explained below.

Each lens 50 also has a depression 70 at each corner inside the rectangular wall 54 that fits over an integral plastic pedestal 72 of the housing shell 22 or 24 at each inside corner of the lens cavity 36 as best shown in FIG. 4.

Each electrical subassembly 52 comprises a circuit board 73 that carries a array of light emitting diodes (LEDs) 74 in an electrical circuit that is energized by electric lead wires 76. The circuit board 73 may also carry other electrical components connected into the circuit for operating the LEDs in a steady or flashing manner. The LEDs 74 are arranged in a pattern corresponding to the hollow embossments 60 which in this particular instance essentially form the letters that spell the word stop. The LEDs 74 fit into the hollow letter shaped embossments 60 of the associated lens 50 when the electrical subassembly 52 is inserted into the part of the compartment 56 provided by the associated lens 50 and attached to the associated lens 50 by means of the circuit board 73. For such attachment, the circuit board 73 is placed on the corner depressions 70 of the associated lens 50 and secured to the pedestals 72 by four fasteners 75. This attachment also provides addition attachments for securing the associated lens 50 to the housing shell 22 or 24. The corner depressions 70 of the lens 50 and the pedestals 72 of the housing shells 22 and 24 locate the circuit board 73 in a precise manner so that the LEDs 74 protrude into the embossments 60 to effectively light up the embossments 60 and so that space is provided on each side of the board for electrical components and/or solder tails.

FIG. 5 shows a rear subassembly of the illuminated sign assembly 18. This rear subassembly comprises rear shell 24, a typical lens 50 and a typical electrical subassembly 52. The lens 50 is initially heat staked to the rear housing shell 24 as indicated above. The lens 50 and the electrical subassembly 52 are then secured to the rear housing shell 24 by fasteners 75. The lead wires 76 are then positioned in the open wiring channel 40 to pass through the interior of hollow sign housing 20 from the lens cavity 36 to the outlet 49 in the lower hinge arm 30 using the network of wiring channels as indicated above.

The illuminated sign assembly 18 also has a front subassembly comprising front shell 22, lens 50 and electrical subassembly 52 that are fastened together in the same manner.

The front and rear subassemblies share two plastic elbows 78 that are disposed in the ends of the respective hinge arms 28 and 30 that are formed when these two subassemblies are then fastened together to complete the illuminated sign assembly 18. The plastic elbows 78 are hollow and have vertical portions that project through the confronting outlets 49 to provide external pivots 80 and hexagonal drive lugs 82 for pivotally and drivingly connecting illuminated sign assembly 18 to the actuator assembly 14. These plastic elbows 78 are assembled to one or the other of the front and rear subassemblies 22 and 24 and the lead wires 76 of both subassemblies are threaded through at least one of the plastic elbows 78 before the front and rear subassemblies are attached together. In the particular embodiment being described, the lower plastic elbow 78 is assembled to lower hinge arm part of the rear subassembly as shown in FIG. 5 and the lead wires 76 of both subassemblies are threaded through this one plastic elbow before the front and rear subassemblies are attached together.

The front and rear subassemblies are fastened together by securing the front and rear housing shells 22 and 24 to each other. The housing shells 22 and 24 are fastened together by a unique fastening arrangement that forms a good peripheral seal at the mating surfaces of the housing shells 22 and 24 while at the same time preserving smooth facial surfaces of the housing shells 22 and 24 for the application of reflective sheets of material.

Basically this unique fastening arrangement comprises fastening the hollow octagonal sign 26 together with peripheral side wall fasteners primarily limiting any use of facial fasteners to the hinge arms 28 and 30.

The front and rear housing shells 22 and 24 have mating peripheral side walls 84 and 86 respectively as best shown in FIGS. 3, 4 and 5. The peripheral side wall 84 of the front housing shell 22 has an inner lip 88 that overlaps an outer lip 90 of the rear housing shell 24. The front housing shell 22 also has a plurality of lugs 92 that are integrally attached to the peripheral side wall 84 below the inner lip 88 and that extend outwardly of the inner lip 90 so that the lugs 92 are located below the peripheral side wall 86 of the rear housing shell 24 when the housing shells 22 and 24 are mated as shown in FIGS. 3 and 4.

Each attachment lug 92 has a radial hole and the peripheral side wall 86 of the rear shell 24 has a plurality of holes that align with the respective radial holes of the attachment lugs 92. The peripheral side walls 84 and 86 are attached together by threaded fasteners 94 that project through the holes of the peripheral side wall 84 and screw into the attachment lugs 92 as best shown in FIGS. 3 and 4.

The attachment lugs 92 are inclined away from the peripheral side wall 86 by a few degrees so that the attachment lugs 92 are pulled toward the peripheral side wall 86 when the threaded fasteners 94 are applied. This biases the inner seal lip 88 radially outwardly into tight sealing engagement with the outer sealing lip 90. The side walls 84 and 86 are also preferably inclined away from each other in a radially inward direction when the side walls 84 and 86 are fastened together so that any water, snow or ice that accumulates on the top of the sign assembly flows away from the mating line of the shells 22 and 24.

Each of the housing shells 22 and 24 also has a plurality of locator ribs 96 that are integrally attached to the respective peripheral side walls 84 and 86 at their respective radially inward surfaces. Ribs 96 project outwardly of the sealing lips 88 and 90 in the longitudinal direction and engage the mating peripheral side wall at the radially inward surface to facilitate assembly and enhance the sealing effectiveness of the sealing lips 88 and 92.

The hinge portions of the front and rear housing shells 22 and 24 may be and preferably are attached together by threaded fasteners 98 that are screwed into mating attachment lugs 99 integrally attached to the inside faces of the shells 22 and 24 via holes in the face of the rear housing shell 24.

The sealing and fastening structure of the front and rear shells 22 and 24 may be reversed. However, it is always preferable to locate the access holes for the radial lugs 42 and the mating attachment lugs 99 in the rear housing shell 24 to improve appearance and deter tampering particularly when the bezel 16 is used.

This fastening arrangement provides a good peripheral seal at the interface of the mating housing shells 22 and 24 and leaves smooth facial surfaces on the hollow octagonal sign 26 surrounding the slots 64 in the housing shells 22 and 24 and the protruding hollow lens embossments 60. These smooth facial surfaces accommodate reflective sheets of material 100 which are preferably attached to the faces of the housing shells 22 and 24 as part of the illuminated sign assembly 18. In the particular embodiment shown for illustrative purposes in FIGS. 1–5, each sheet of reflective material 100 is octagonal in shape and preferably colored red with a white border 101 and open white letters 102 that spell out the word stop and outline the letter embossments 60 so that the illuminated sign assembly 18 mimics the familiar traffic stop sign.

As indicated above, the illuminated sign assembly 18 may be provided with a bezel 16 to enhance appearance and provide protection when the illuminated sign assembly 18 is in the stored position adjacent the street side of the bus 10.

The bezel 16 comprises a generally planar body 110 that is octagonal and a bit larger than the octagonal sign 26 of the illuminated sign assembly 18 as best shown in FIG. 2. The bezel 16 has a continuous upstanding flange 112 at the periphery of the body that defines a gap 114 at one end of the body 110 for accommodating the hinge arms 28 and 30 of the illuminated sign assembly 18 as best shown in FIG. 2. The flange 112 is U-shaped in cross section to increase rigidity of the bezel 16 and strengthen the bezel 16 at the periphery. The flange 112 is also preferably high enough to cover the rear housing shell 24 as shown in FIGS. 3 and 4. This improves appearance and guards the fasteners 94 and access holes in the side wall 86 against tampering and weather damage.

The bezel 16 also a depending rectangular wall 116 that extends from the one end of the body 110 to the opposite end. This rectangular wall 116 increases the strength of the mid section and twist resistance of the bezel 16. The bezel 16 includes two attachment lugs 118 that project outwardly from the rectangular wall 116 at the one end of the bezel 16 in a direction substantially parallel to the generally planar body 110. The bezel 16 further includes two depending hollow attachment lugs 120 that extend in a direction substantially perpendicular to the generally planar body 110. These hollow lugs 120 are located inside the rectangular wall 116.

The bezel 16 is attached to the street side of the bus 10 by cutting a rectangular hole in the outer side panel 122 of the bus 10. The depending rectangular wall 116 is then inserted into the hole and the bezel 16 is then fastened to body structure 124 of the bus 10 that is beneath the outer side panel by suitable fasteners (not shown) that are inserted through the lugs 120 and fastened to body structure 124. The bezel 16 is also preferably attached to the outer side panel of the bus 10 at the gap end by suitable fasteners inserted through the lugs 118 and fastened to side panel 122.

After the bezel 16 is attached, the actuator assembly 14 and the illuminated sign assembly 18 are attached to the street side of the bus 10 as a unit by fastening the actuator assembly 14 to the outer side panel 122. Fasteners for the actuator assembly 14 may also be used to fasten the lugs 118 of the bezel 16 to the outer side panel of the bus 10.

The attached bezel 16 enhances the appearance of the illuminated sign assembly 18 by hiding the gap between the illuminated sign assembly 18 and the outer side panel 122 of the bus 10 when the illuminated sign assembly 18 is in the stored position. The bezel 16 also acts as a wind guard that reduces wind noise and guards against wind pivoting the illuminated sign assembly 18 outwardly from the side panel of the bus 10 when the bus 10 is traveling between stops. Furthermore bezel 16 guards against damage from snow and ice accumulating between the illuminated sign assembly 18 and the side panel of the bus 10 or vandals prying the illuminated sign assembly 18 away from the side panel of the bus 10 when the sign assembly 18 is in the stored position.

Figure 6:
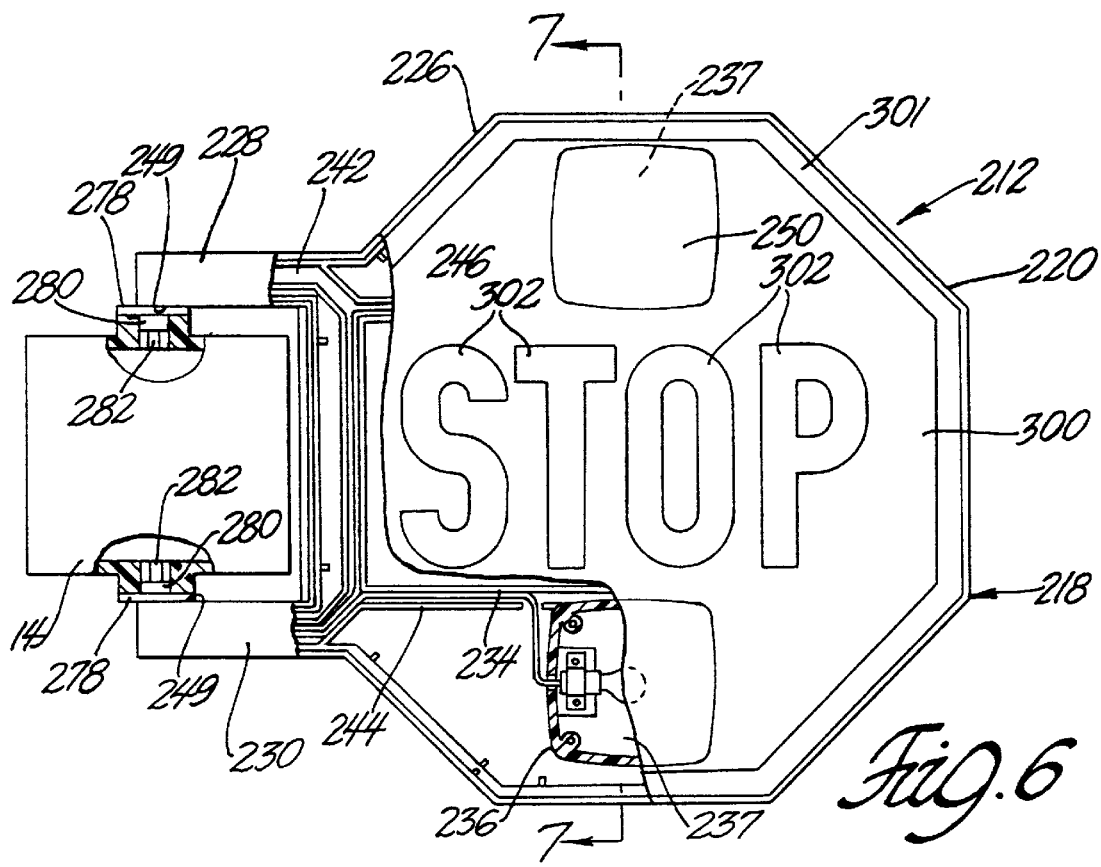
FIG. 6 is a partially sectioned front view of an illuminated sign assembly in accordance with a second embodiment of the invention.
Figure 8:
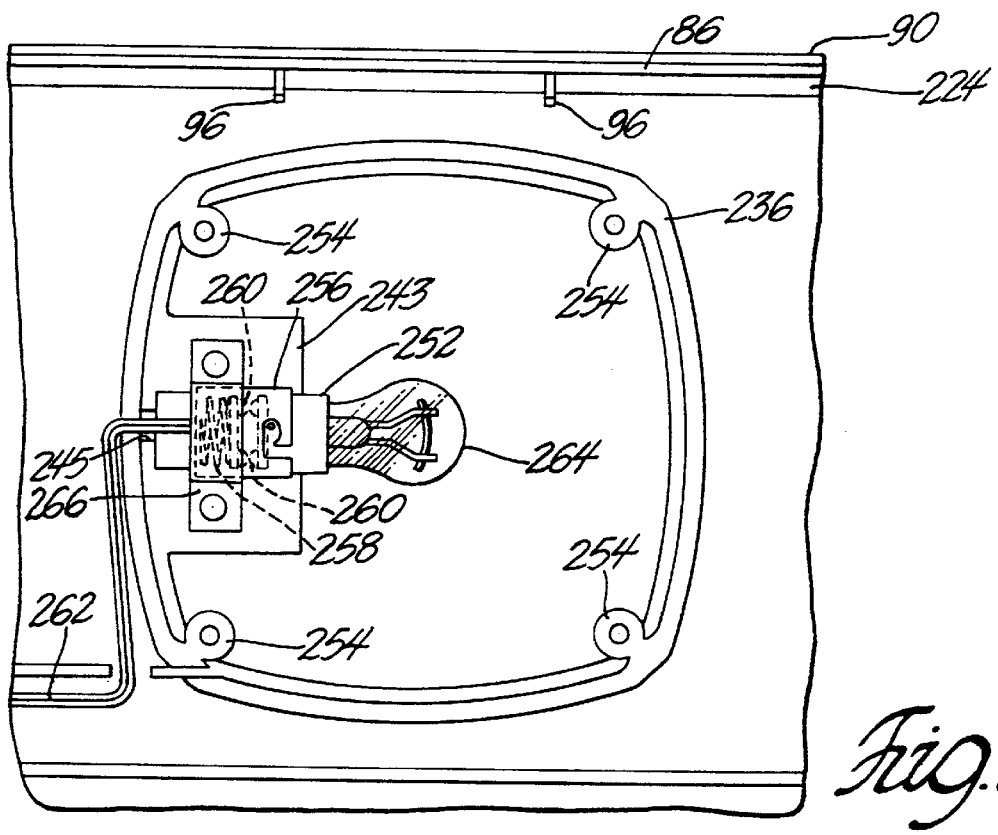
FIG. 8 is a section taken substantially along the line 8—8 of FIG. 7 looking in the direction of the arrows.
Figure 7:
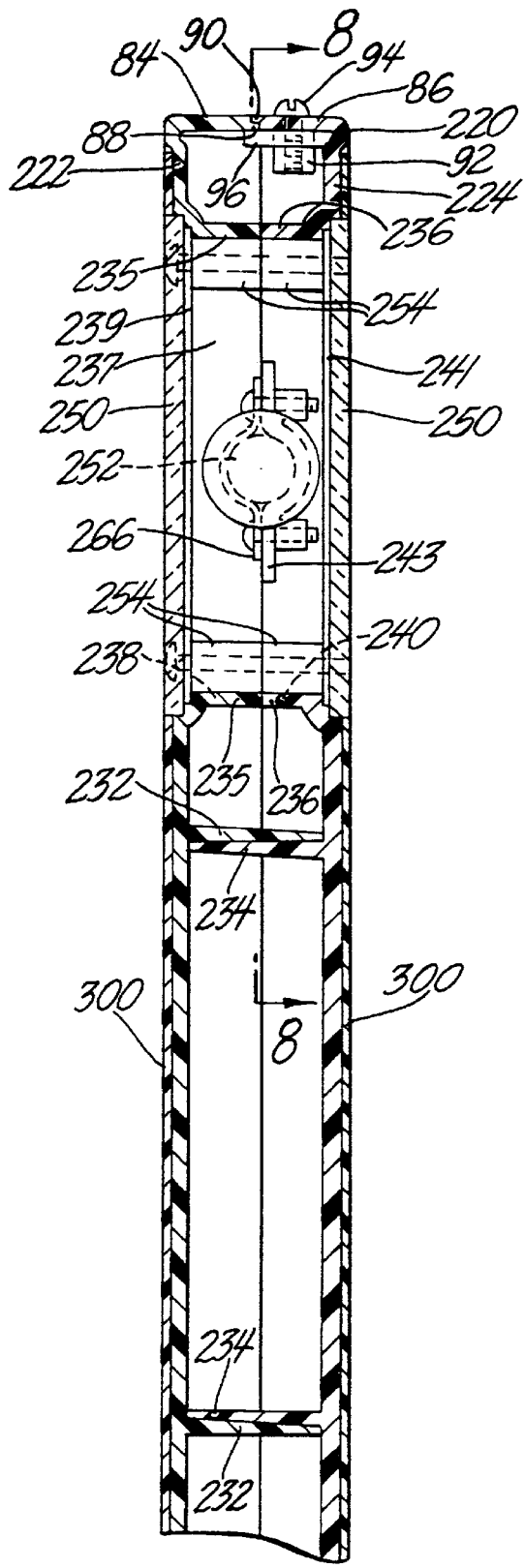
FIG. 7 is a section taken substantially along the line 7—7 of FIG. 6 looking in the direction of the arrows.

FIGS. 6, 7 and 8 illustrate a second embodiment of my invention. In this second embodiment, a second stop sign mechanism for the school bus 10 of FIG. 1 is indicated generally at 212. The stop sign mechanism 212 comprises the sealed electrical actuator assembly 14 and the optional bezel 16 (not shown) of FIGS. 1–5 that are mounted on the street side of the school bus 10 and an alternate illuminated sign assembly 218 having integral hinge arms that are attached to the actuator assembly 14 for pivotal movement.

The illuminated sign assembly 218 is of the general type that has lamp assemblies disposed above and below indicia such as the word stop. The illuminated sign assembly 218 also comprises a molded plastic, preferably opaque housing 220 having a front shell 222 and a rear shell 224 that are attached together to provide a hollow octagonal sign 226 having two horizontal, vertically spaced hollow hinge arms 228 and 230 for pivotally attaching the sign assembly 218 to the actuator assembly 14.

The front and rear shells 222 and 224 are basically mirror images of each other with some modifications that will become clear from the following description.

The front shell 222 has a deep internal rectangular wall 232 and the rear shell 224 has a corresponding deep internal rectangular wall 234. The walls 232 and 234 are sized so that one slides and fits within the other when the housing shells 222 and 224 are fastened to each other. In this particular instance the rear wall 234 fits within the front wall 232 however, the reverse arrangement can be used. In any event, the walls 232 and 234 are preferably deep enough so that each wall fully overlaps the other and bottoms out on an interior face of the opposite shell as best shown in FIG. 7. This provides a very strong and stable central section of the hollow sign 326 for carrying indicia such as the word stop shown in FIG. 6.

The front and rear shells 222 and 224 each also have a pair of generally square, shallow walls 235 and 236 respectively that abut each other and form two identical upper and lower lamp compartments 237 when the shells 222 and 224 are secured together. Each lamp compartment 237 has two lens openings 239 and 241 in the respective housing shells 222 and 224. In addition, each of the generally square walls 236 forming an integral part of the rear housing shell 224 have an integral cradle 243 that is attached to a vertical side of the wall 236 and extends inwardly into the lamp compartment 237 in cantilever fashion. This vertical side also has an outlet 245 that is aligned with the cradle 243.

The front and rear shells 222 and 224 further include a number of shallow walls 238 and 240 respectively that cooperate with the deep rectangular walls 232 and 234 and exterior walls of the hinge arms 228 and 230 to form a network of open wire channels in each shell. These shallow internal walls 238 and 240 abut each other to close the open wire channels when the shells 222 and 224 are secured together as in the case of the first embodiment.

The network of channels formed by the walls 232, 234, 238 and 240 comprises two horizontal wire channels 242 and 244 that extend from the middle of the longer side of the deep overlapping rectangular walls 232 and 234 to the respective exterior corners of these overlapping walls adjacent the hinge arms 228 and 230 where the channels 242 and 244 communicate with each other by means of a vertical channel 246. The horizontal channels 242 and 244 then continue on through the respective hollow hinge arms 228 and 230 to confronting outlets 249 in the respective ends of the two associated hinge arms 228 and 230.

This network of channels provides several continuous paths for electrical wiring from the two lamp compartments 237 to pass through the interior of the sign housing 220 to the outlet 249 at the end of either hinge arm 228 or 230.

In the case of the lamp type illuminated sign assembly 218, each lamp compartment 237 preferably has a single outlet such as outlet 245 and the electrical wiring from each lamp compartment 237 is preferably initially led out of the hollow sign housing 220 through the nearest horizontal wiring channel 242 or 244 until the vertical wiring channel 246 is reached. At this point the electrical wiring in one of the horizontal wiring channels 242 or 244 may be combined with the electrical wiring in the other horizontal wiring channel by means of the vertical wiring channel 246 and then led out of one of the outlets 249 through a common wiring channel. In this instance the electrical wiring in the upper wiring channel 242 is preferably fed through the vertical wiring channel 246 and into the lower wiring channel 244. The combined electrical wiring is then fed out of the lower hinge arm 230. This arrangement minimizes the potential for water damage to the electrical wiring.

The illuminated sign assembly 218 comprises four identical translucent lenses 250 that are associated with the respective front and rear shells 222 and 224 in an identical manner and two identical lamp sockets 252 that are associated with the respective lamp compartments 237 in an identical manner.

Each lens 250 is substantially square with a smooth outer surface and concentric radially spaced ridges on an inner surface (not shown). Each lens 250 has a countersunk hole at each corner for attaching the lens 250 to one of the lamp compartments 237 that are formed as an integral part of the housing shells 222 and 224. Each lens 250 fits in a lens opening 239 or 241 against a shoulder defined by wall 235 or 236 and is attached to the shell 222 or 224 by four threaded fasteners that screw into lugs 254 located in the respective inner corners of each lamp compartment 237. Each housing shell 222 and 224 has eight such lugs for upper and lower lenses.

Each lamp socket 252 comprises a metal shell 256 that houses a moveable contact plate 258 that carries two fixed electrical contacts 260 that are connected to the respective conductors of a dual conductor lead wire 262 that leads out of one end of the metal shell 256. The opposite end or socket end of the metal shell 256 is adapted to receive the base of an electric lamp bulb 264. The socket end has the customary bayonet slots to retain the lamp bulb base. The lamp socket 252 also includes a coil spring that biases the plate 258 toward the socket end of the metal shell 256 so that the contacts 260 are biased against mating contacts on the lamp base.

The lamp socket 252 is mounted in the lamp compartment 237 by a metal strap 266 that is preferably welded to the shell 256. Strap 266 is fastened to cradle 243 at each end to clamp the shell 256 against the cradle 243. The lamp socket 252 is fastened to the cradle 243 so that the lead wire 262 passes through the outlet 245.

The illuminated sign assembly 218 comprises a rear subassembly that includes the rear housing shell 224, two lenses 250 that are attached to the two lens openings 241 of the two respective partial lamp compartments 237 and two lamp sockets 252 that are fastened to the cradles 243 in the respective partial lamp compartments 237 formed by the walls 236 of the rear housing shell 224. The illuminated sign assembly 218 also comprises a front subassembly that includes front shell 222, and two lens 250 that attached to the two lens openings 239 of the respective partial lamp compartments 237 formed by the walls 235 of the front housing shell 222.

The front and rear subassemblies share two plastic elbows 278 that are disposed in the ends of the respective hinge arms 228 and 230 that are formed when these two subassemblies are fastened together to complete the illuminated sign assembly 218. The plastic elbows 278 are hollow and have vertical portions that project through the confronting outlets 249 to provide external pivots 280 and hexagonal drive lugs 282 for pivotally and drivingly connecting illuminated sign assembly 218 to the actuator assembly 14 as described above. These plastic elbows 278 are assembled to one or the other of the front and rear subassemblies and the lead wires 262 of both lamp sockets 252 are threaded through at least one of the plastic elbows 278 before the front and rear subassemblies are attached together. In the particular embodiment being described, the lower plastic elbow 278 is preferably assembled to lower hinge arm part of the rear subassembly 224 and the lead wires 262 of both lamp assemblies are threaded through this one plastic elbow 278 before the front and rear subassemblies are attached together as indicated in FIG. 6.

The front and rear subassemblies are fastened together by securing the front and rear housing shells 222 and 224 to each other. The housing shells 222 and 224 are fastened together using the same unique fastening arrangement that is described in connection with the first embodiment and like parts are identified with the same numerals. As indicated above, this fastening arrangement forms a good peripheral seal at the mating surfaces of the two housing shells 222 and 224 while at the same time preserving smooth facial surfaces of the housing shells 222 and 224 for the application of reflective sheets of material.

However in this instance, the fastening arrangement preserves smooth facial surfaces on the hollow octagonal sign 226 surrounding the upper and lower lenses 250 that are attached to each housing shell 222 and 224. These smooth facial surfaces accommodate reflective sheets of material 300 which are preferably attached to the faces of the shells 222 and 224 as part of the illuminated sign assembly 218. In the particular embodiment shown for illustrative purposes in FIGS. 6, 7 and 8, each sheet of reflective material 300 is octagonal in shape and preferably colored red with a white border 301 and enlarged white letters 302 that spell out the word stop to provide indicia located between cutouts for the upper and lower lenses 250. It should be noted that the indicia, i.e. the word stop is preferably within the facial portion of the hollow octagonal sign 226 that is supported by the deep overlapping walls 234 and 232 that provide a strong and stable mid section for the hollow octagonal sign 226 when the reflective sheet of material 300 is attached to the face of each housing shell.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A trim bezel for improving appearance and safeguarding an illuminated sign assembly having a front shell and a rear shell that are fastened together to provide a hollow sign having spaced hollow hinge arms for pivotally mounting the sign assembly on a side of a school bus the trim bezel comprising:

a generally planar body,
   a continuous upstanding flange that extends partially around the periphery of the body and defines a gap at one end of the body for accommodating the hollow hinge arms, and
   a depending rectangular well projecting from the body in an opposite direction of the upstanding flange for strengthening the mid section of the body.

2. The trim bezel as defined in claim 1 wherein the flange is U-shaped in cross section to increase rigidity and torsional resistance of the generally planar body.

3. The trim bezel as defined in claim 2 wherein the rectangular wall extends from the one end to an opposite end of the generally planar body.

4. The trim bezel as defined in claim 3 wherein the body has hollow depending attachment lugs located inside the rectangular wall.

5. The trim bezel as defined in claim 4 wherein the rectangular wall has attachment lugs at the one end that extend outwardly of the body in a generally parallel direction with respect to the body.

6. The trim bezel as defined in claim 1 wherein the flange has a height sufficient to cover a peripheral side wall of the rear shell.

* * * * *

UNITED STATES PATENT AND TRADEMARK OFFICE
CERTIFICATE OF CORRECTION

PATENT NO. : 6,099,933  
DATED : August 8, 2000  
INVENTOR(S) : Ronald C. Lamparter Page 1 of 1

It is certified that error appears in the above-identified patent and that said Letters Patent is hereby corrected as shown below:

Title page,
Item [54], the Title should read -- TRIM BEZEL FOR ILLUMINATED SIGN ASSEMBLY --

Signed and Sealed this

Twenty-sixth Day of February, 2002

Attest:

*Attesting Officer*

JAMES E. ROGAN
*Director of the United States Patent and Trademark Office*